(12) United States Patent
Arnott et al.

(10) Patent No.: US 6,782,450 B2
(45) Date of Patent: Aug. 24, 2004

(54) FILE MODE RAID SUBSYSTEM

(75) Inventors: Randy M. Arnott, Mont Vernon, NY (US); Eric S. Noya, Groton, MA (US)

(73) Assignee: Raidcore, Inc., Nashua, NH (US)

(*) Notice: Subject to any disclaimer, the term of this patent is extended or adjusted under 35 U.S.C. 154(b) by 412 days.

(21) Appl. No.: 10/011,224

(22) Filed: Dec. 6, 2001

(65) Prior Publication Data

US 2003/0110353 A1 Jun. 12, 2003

(51) Int. Cl.[7] ............................................. G06F 13/00
(52) U.S. Cl. ...................................................... 711/114
(58) Field of Search ............................ 711/114; 714/6

(56) References Cited

U.S. PATENT DOCUMENTS

| | | | |
|---|---|---|---|
| 4,993,030 A | 2/1991 | Krakauer et al. | 714/6 |
| 5,689,706 A | 11/1997 | Rao et al. | 707/201 |
| 5,987,506 A | 11/1999 | Cartert et al. | 709/213 |
| 6,163,856 A | 12/2000 | Dion et al. | 714/4 |
| 6,195,650 B1 | 2/2001 | Gaither et al. | 707/1 |
| 6,219,693 B1 * | 4/2001 | Napolitano et al. | 709/203 |
| 6,301,605 B1 | 10/2001 | Napolitano et al. | 709/201 |
| 2002/0120789 A1 * | 8/2002 | Franklin et al. | 709/325 |

* cited by examiner

*Primary Examiner*—Glenn Gossage
(74) *Attorney, Agent, or Firm*—Sterne Kessler Goldstein & Fox p.l.l.c.

(57) ABSTRACT

A method and system enables data redundancy across servers, networks, and controllers by using standard redundant files as underlying storage for RAID subsystem configurations. A redundant array of independent disk (RAID) subsystem includes a front-end interface configured to process non-redundant requests received from a primary file system communicating with an application program. A back-end interface of the RAID subsystem is configured to process redundant requests corresponding to the non-redundant requests. The redundant requests to be issued to a secondary file system communicates with a block mode device including multiple physical storage devices.

20 Claims, 11 Drawing Sheets

FILE MODE RAID SUBSYSTEM

FIELD OF THE INVENTION

This invention relates generally to the field of disk storage subsystems, and more particularly to redundant arrays of independent disks (RAID).

BACKGROUND OF THE INVENTION

Modern, large-scale computer systems are usually configured with client and server computers connected via a network. The network can include local and wide area (Internet) components. The client computers, typically desk- or lap-top computers, provide a graphical user interface (GUI), a relatively small amount of local processing and storage, and user application programs. However, it is the server computers that provide the heavy duty processing, and bulk storage for files and databases. For data integrity purposes, the storage subsystems are usually in the form of a redundant array of independent disks (RAID).

A RAID subsystem protects against a disk drive malfunction. By using many disk drives, and storing redundant data along with user data, a disk drive failure will not cause a permanent loss of data. The manner in which the RAID subsystem provides data redundancy is called a RAID level. A number of RAID levels are known. RAID-1 includes sets of N data disks and N mirror disks for storing copies of the data disks. RAID-3 includes sets of N data disks and one parity disk. RAID-4 also includes sets of N+1 disks, however, data transfers are performed in multi-block operations. RAID-5 distributes parity data across all disks in each set of N+1 disks. At any level, it is desired to have RAID systems where an input/output (I/O) operation can be performed with minimal operating system intervention.

FIG. 1, in a very general way, shows a model of the interactions between an application program 101 and physical storage media 111 of a computer system, be it a client or a server computer. The application 101 makes non-redundant file I/O requests 102, or "calls," to a primary file system 104 to access non-redundant file I/O data 103. The application can be a foreground application, for example a word processor, or a background application, e.g., a file back-up system. Generally, the access requests 102 can be for data input (read) or data output (write) operations.

The primary file system 104 typically assumes the physical storage media is in the form of a block mode device 111. The block mode device can be single disk, multiple disks, or tapes, or other high capacity, relatively low latency, non-volatile memories. Therefore, the primary file system makes non-redundant block I/O requests 105 to a block server 107 of a prior art block mode RAID subsystem 100 to read or write non-redundant block I/O data 106. The RAID subsystem 100 uses a block mode interface 110 and makes redundant block I/O requests 108 to the disks 111 for redundant block I/O data 109.

Clearly, the primary function of the traditional block mode RAID subsystem 100 is to translate non-redundant block I/O requests and non-redundant block data into redundant block I/O requests and redundant block data. Storing at least two copies of each data block on at least two different physical devices provides this redundancy, so that should one device fail, the block can still be recovered. In some RAID levels, parity blocks provide the redundancy.

FIG. 2 shows interactions in a client-server type of arrangement of computers with a primary file system 104 configured to work over a network 204. Here, the file system 104 has a client side 201 and a server side 202. The network 204 transports data between the client side 201 and server side 202 of the file system 104. The application 101 directly calls 102 the client side 201 of the file system 104, and the server side 202 makes calls 105 to the traditional block mode RAID subsystem 100 of the server system 203.

In the arrangements shown in FIGS. 1 and 2, the RAID subsystem 100 is used to increase reliability of the system. However, the RAID subsystem 107 protects only against failures in the block mode device 111. Therefore, there are still many other points of failure in the system, each one represented by the components other than the disks used in these arrangements. To protect against failures by these other components, one must provide redundancy for the other components as well. Some examples of these components are memories, busses, controllers, and processors. The term storage area network (SAN) is typically used to describe this type of redundant arrangement.

FIG. 3 is an example of a SAN 300. Client computers 301–303 communicate with the SAN via the network 204. The SAN 300 appears as one large server computer to the client computers 301–303. The SAN 300 includes server computers 321–323, connected by a redundant bus 331 to shared RAID controllers 341–342, and the RAID controllers 341–342 are connected to a shared block mode device 361 via a shared bus 351 which may also be redundant. Thus, any component in the SAN 300 can fail without losing the ability to serve the client computers.

Large scale SANs are complicated and usually configured for specific mission-critical applications, for example, banking, stock markets, airline-reservation, military command and control, etc. In addition, elaborate schemes are often used to provide redundant block-mode data access via wide area networks (WANs) in case of major disasters. Therefore, SANs usually includes many proprietary components, including much one-of-a-kind software that performs system management. The low-volume, proprietary aspects of SANs makes them very expensive to build and operate.

Another approach to allowing redundancy across major components is to virtualize files at the file system level, and serve a set of files from that, see for example, U.S. Pat. No. 5,689,706 issued to Rao on Nov. 18, 1997 "Distributed Systems;" U.S. Pat. No. 6,163,856 issued to Dion on Dec. 19, 2000 "Method and Apparatus for File System Disaster Recovery;" and U.S. Pat. No. 6,195,650 issued to Gaither on Feb. 27, 2001 "Method and Apparatus for Virtualizing File Access Operations and Other I/O Operations."

However, these prior art SAN systems still have the following problems. They require the use of a specific proprietary distributed file system. They do not allow the use of file systems that are standard to client processors. They cannot be used with databases or other applications that use a block mode device with no file system. Because of these limitations, systems based on those implementations may never provide the features in widely used file systems, and may be limited to a few expensive operating systems.

Therefore, there still is a need for a system and method that provides data redundancy using standard components, interfaces and networks, and provides block mode access for maximum flexibility of application usage.

SUMMARY OF THE INVENTION

The present invention provides data redundancy at the file level, instead of at the block level as in the prior art. The redundancy is provided in a file mode form, rather than a block mode form as in the prior art. Therefore, file data can be located on any system or server, including a local system, or a server on a local area network, or a remote server on a wide area network. Because files are easily shared over networks through standard high volume, low cost hardware, software, and protocols, the file mode redundancy based on files has a level of data redundancy that is as high or higher than a traditional SAN, with more flexibility than a distributed file system. Using the invention, most costs remain consistent with high volume commodity components.

Depending on where files are stored, high performance and reliability can be achieved through disks on the local system that include file systems, and extremely high reliability can be achieved by using disks on network servers that have file systems. With the invention, disaster recovery is trivial to implement because files can be shared over a WAN, using well-known protocols, among any system which uses any operating system for sharing files.

The invention enables application programs to use block mode devices located anywhere for databases or specific file systems. The resulting devices, in combination with a file system, can then be shared out over the network so other application programs can use the devices, enabling a SAN that uses only a file system for connectivity.

More particularly, a method accesses data with a redundant array of independent disk (RAID) subsystem by having an application generate non-redundant file I/O requests for a primary file system. In the RAID subsystem, non-redundant block I/O requests corresponding to the non-redundant file requests received from the primary file system are generated. The non-redundant block I/O requests are then translated into redundant file I/O requests for redundant file I/O data maintained by the RAID subsystem, and in a secondary file system, the redundant file I/O requests are translated into non-redundant block I/O requests for a block mode device.

DETAILED DESCRIPTION OF THE PREFERRED EMBODIMENTS

RAID Subsystem with Redundant Files
System Structure

Figure 4:
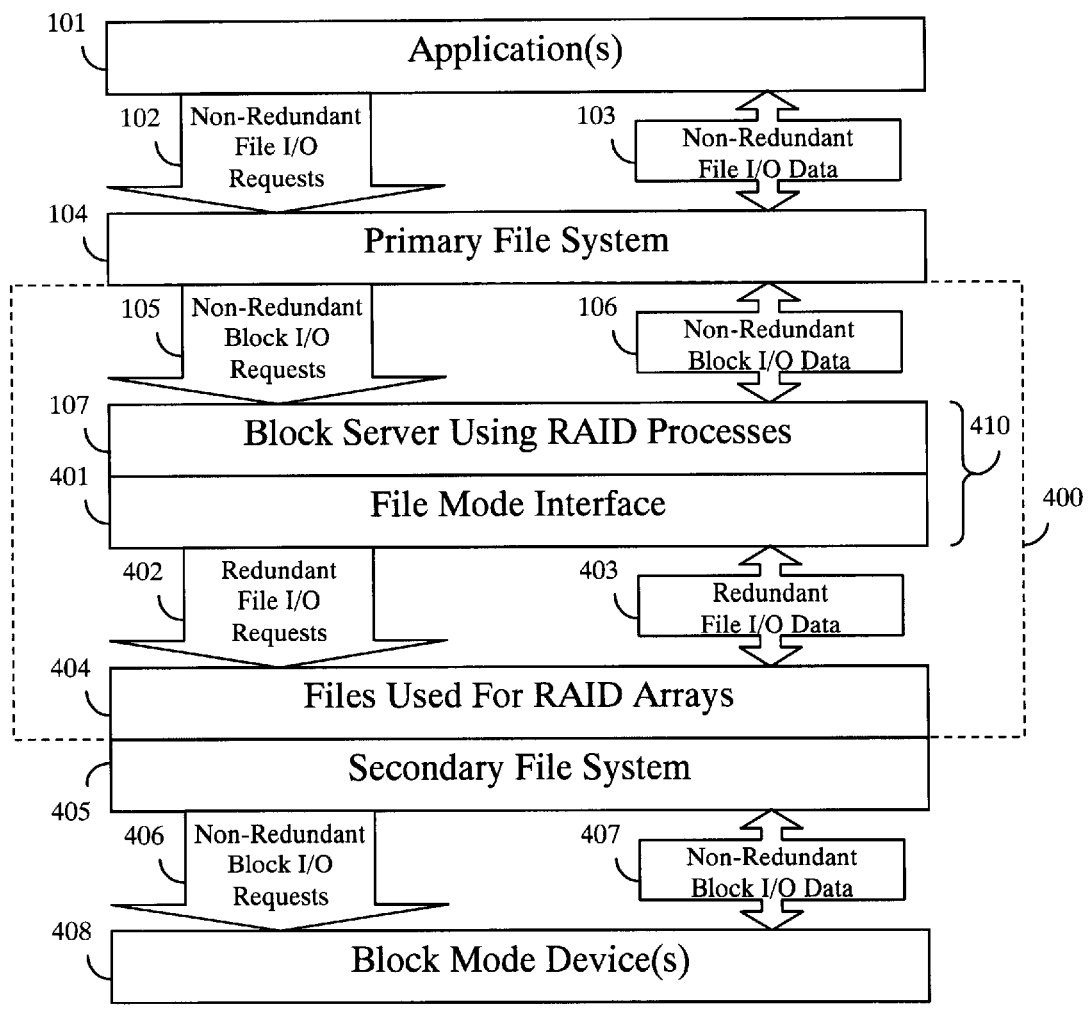
FIG. 4 is a block diagram of a file mode RAID subsystem according to the invention.

FIG. 4 shows a file mode RAID subsystem 400 according to the invention. The arrangement shown includes the following layers, from top to bottom: an application program 101, a primary file system 104, the file mode RAID subsystem 400 according to the invention, a secondary file system 405, and a block mode device 408. The RAID subsystem 400 includes a block server 107, a file mode interface 401, and redundant files 404.

System Operation

During operation, the application 101 makes non-redundant file I/O requests 102 to the primary file system 104 to access non-redundant file I/O data 103. In this description, data accesses, generally, can be read or write operations or "calls," and the data can be file data, or database records. The primary file system 104 can be any known file system, standard or not. The application can be a foreground, or background application program, typically executing on a client or server computer.

The primary file system 104 makes non-redundant block I/O requests 105 to the block server 107 of the RAID subsystem 400 for non-redundant block I/O data 106.

The block server interacts with the file mode interface 401. The file mode interface translates the non-redundant block I/O requests into redundant file I/O requests 402 for redundant file I/O data 403 related to redundant files 404 maintained by the RAID subsystem 400. For example, a request to create a new file causes the file mode interface to issue two or more requests to create the new file. Similarly, a request to write a file or database record causes the file mode interface to issue two or more write requests, and a request to delete a file causes two or more changes within the files. Read requests can be selectively issued to optimize throughput, for example, using an access channel or physical device that has the highest bandwidth and the least load.

Therefore, the file mode interface 401 calls 402 into the redundant files 404. The secondary file system 405 translates each redundant file I/O request 402 into non-redundant block I/O requests 406 related to non-redundant block I/O data 407 stored on the block mode device 408, a single disk, or a traditional block mode RAID subsystem 100.

The fact that the file mode RAID subsystem issues redundant requests is totally transparent to the secondary file system. For example, each create file request is handled independently and causes the secondary file system to generate directory information, such as file name, type, size, protection, access restrictions, etc. otherwise known as metadata for each of the redundant requests. As far as the secondary file system is concerned the requests are for two unrelated files, and the file mode RAID system 400 appears and behaves as if were an application program.

It is important to note that the requests 102 and data 103 between the application 101 and the primary file system 104 have the same basic format as the requests 402 and the data 403 between the file system interface 401 and the secondary file system 405, however, the first are non-redundant, while the second are redundant.

While prior art block mode RAID subsystems provide redundancy at the block-level, the file mode RAID subsystem according to the invention provides redundancy at the file-level. The primary file system 104 processes non-redundant requests and data for the user application 101, while the secondary file system processes redundant requests and data for the RAID subsystem 400 according to the invention.

In other words, the file mode RAID subsystem 400 has two interfaces. A front-end interface 107 processes block mode, non-redundant requests received from the primary file system that communicates with application programs. A back-end interface 401 processes file mode, redundant requests to be issued to the secondary file system that communicates with block mode devices. This is substantially different from any known RAID subsystem.

Therefore, the file mode RAID subsystem 400 according to the invention has a number of important advantages over prior art block mode RAID subsystems. First, the redundant files 404 can be located on any system or server, including a local system, or a server on a local area network, or a server that is on a wide area network. Second, the files can be shared over networks using standard, low cost hardware, software, and protocols. Third, the block mode device 408 can now have a level of redundancy that is as high or higher than is currently available for more costly to implement SANs.

Figure 5:
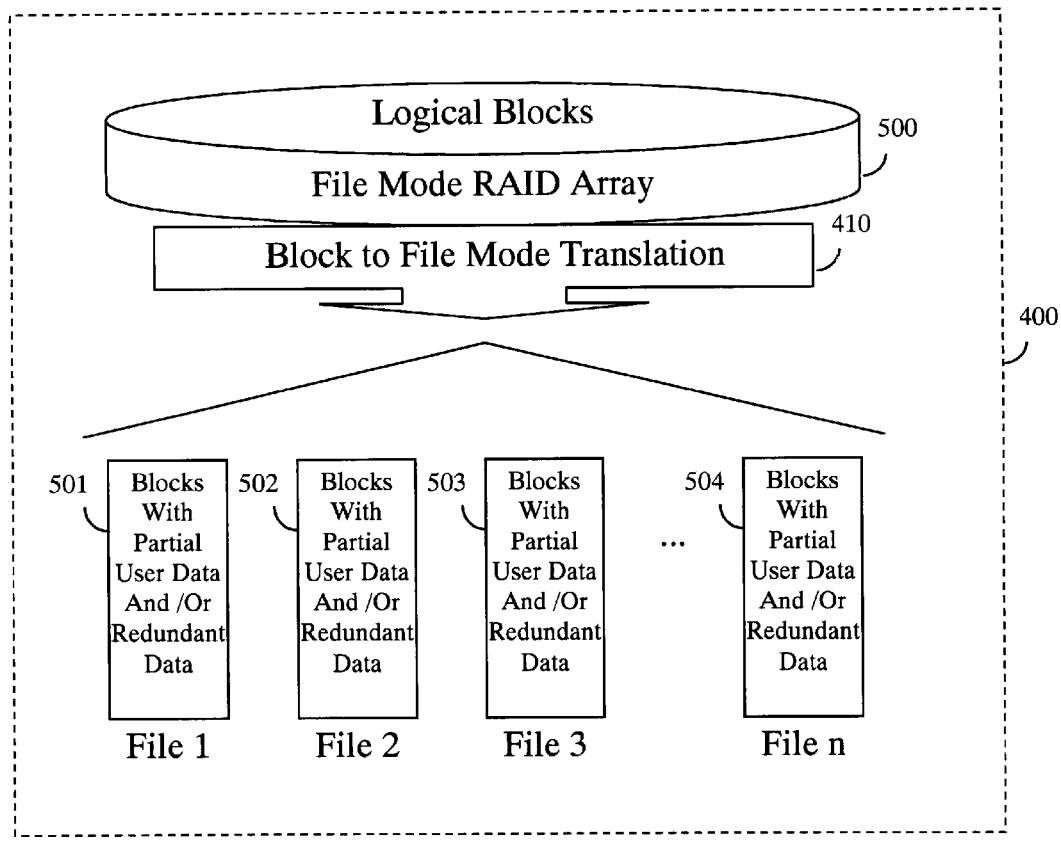
FIG. 5 is a block diagram of logical data structures of the subsystem according to the invention.

While FIG. 4 shows the control and data flow in the RAID subsystem according to the invention, FIG. 5 shows the data structures used by the RAID subsystem 400 at a logical level. A file mode RAID array 500 organizes file (or database) data as logical blocks. The RAID translation 410, takes non-redundant user blocks as input and organizes these blocks into redundant files 501–504.

Herein, a redundant file is defined as a collection of related blocks, including metadata and user data, distributed over multiple physical block mode devices and systems, such that a failure of any one physical device, device controller, system, or network used to create, store and transport that data, will allow complete recovery of the redundant file. This is substantial advantage of the invention.

In the case of an n-way redundancy, for instance, each logical block is duplicated onto each of n files 501–504. Logical blocks served from the file mode RAID array 500 can be used in any way that physical blocks are served from a block mode device.

The description below details various system arrangements where the file mode RAID subsystem according to the invention can be used.

Using File Mode RAID in a Network

Figure 6:
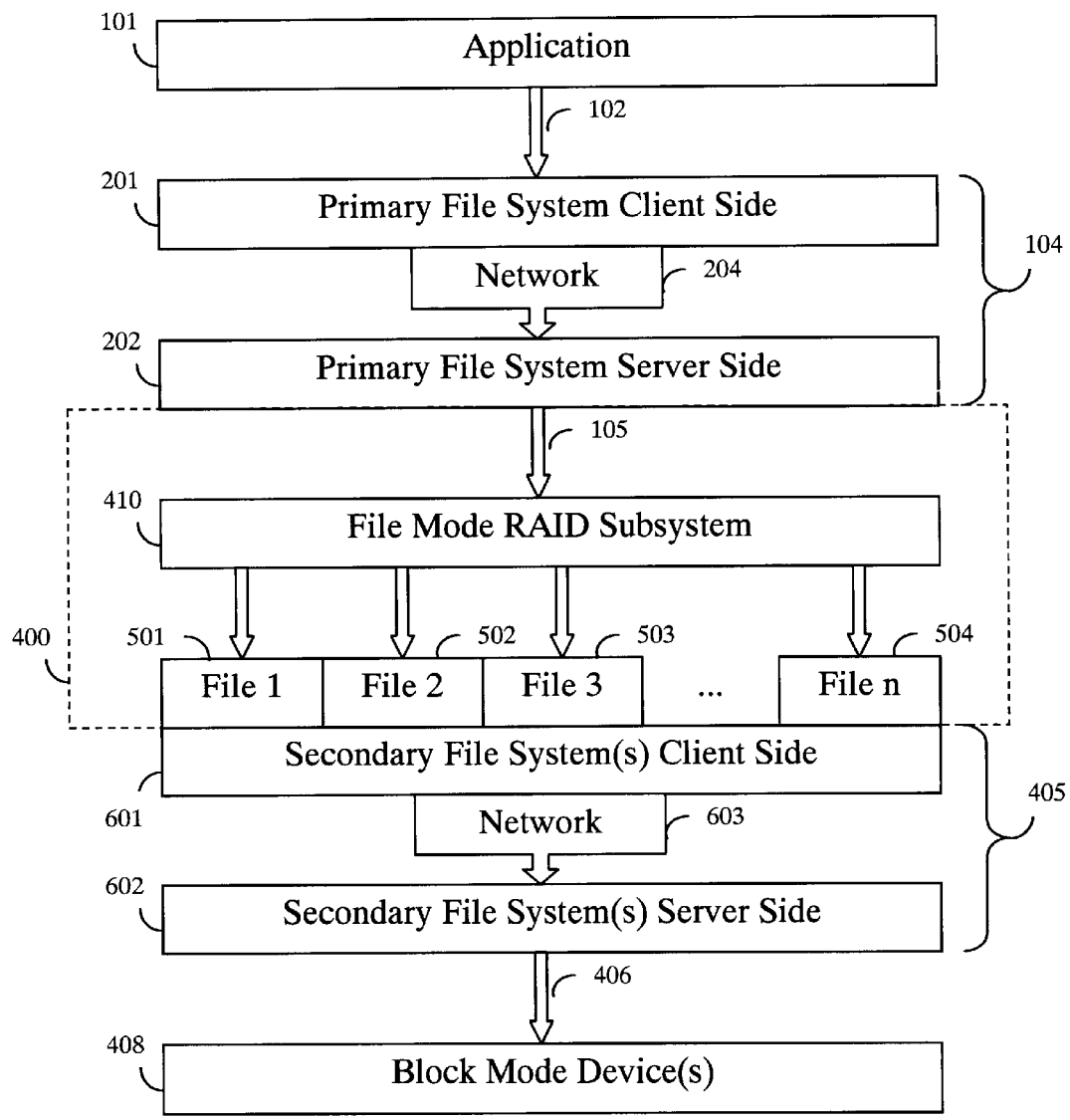
FIG. 6 is a block diagram of a file mode RAID subsystem in a network.

FIG. 6 shows how the file mode RAID subsystem 400 can be used in a networked arrangement. Here, the top-to-bottom layers are: the application 101, the client side 201 and server side 202 of the primary file system 104 connected via the network 204, the RAID subsystem 400 including redundant files 501–504, a client side 601 and server side 602 of the secondary file system 405 communicating via another network 603, and the block mode device 408. Here, the client side and server side of the primary file system can communicate via a local area network, and the client side and server side of the secondary file system can communicate via a wide area network.

Here, the application 101 executes, perhaps, on a client computer of a local area network, and the block mode device is part of a server computer in a wide area network. As an advantage, the file mode RAID subsystem 400 can be located anywhere between the client and the server. As a particular advantage, the redundant files can be transported over the network using any standard protocols, e.g. NFS, NetBIOS, TCP/IP, NetBEUI, SPX/IPX, to name a few. This level of redundancy with standard file systems is not currently available with prior art RAID subsystems.

Figure 7:
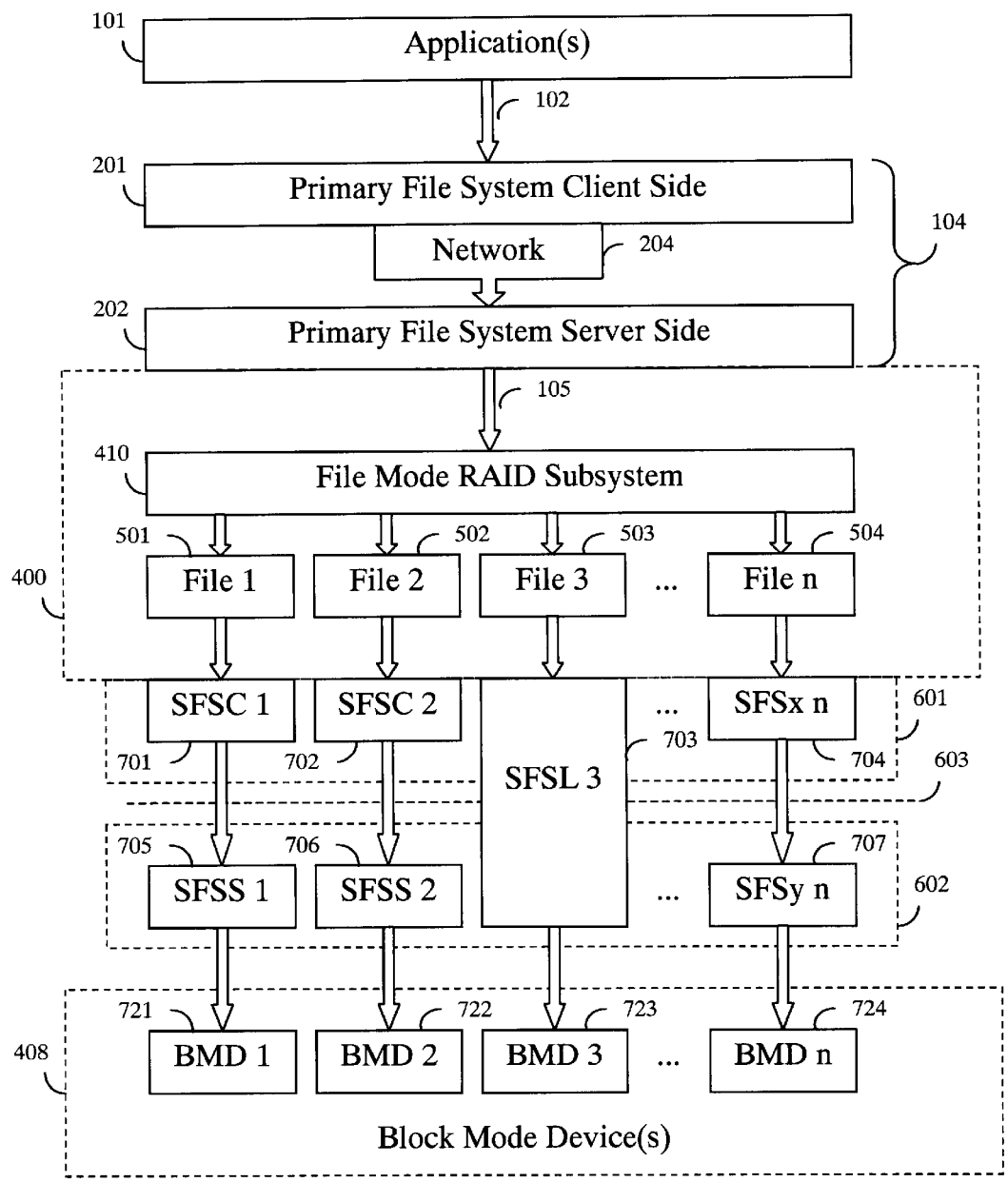
FIG. 7 is a block diagram of a file mode RAID subsystem in a server computer.

FIG. 7 shows how the secondary file system(s) 601 can be partitioned into truly separate secondary file systems (SFSx) 701–707. A client side secondary file systems (SFSC) 701–704 communicate with server secondary file systems (SFSS) 705–707 via the network 603. There is also a local secondary file system (SFSL) 703 that communicates directly with the block mode device 408, i.e., the local secondary file system does not communicate through a network.

The block mode devices 408, e.g. disks or disk arrays, can actually be connected to multiple different computers, perhaps separated by long distances and connected by a wide area network, or for maximum survivability, on different continents. Here, they are shown as separate block mode devices (BMD) 721–724.

The arrangement in FIG. 7 is similar to the arrangement in FIG. 6, except that the secondary file system(s) 601–602 includes separate components 701–707, and the block mode device 408 is actually several individual devices (disks) 721–724.

As shown for the RAID Device subsystem 400 and the block mode device 408, each of the files 501–504 used by the RAID subsystem 400 now has its own stack of components. File 1 501 uses the client side secondary file system 1 (SFSC 1) 701 which communicates via the network 603 to the server side secondary file system 1 (SFSS 1) 705, which in turn uses block mode device 1 (BMD 1) 721.

Similarly, file 2 502 communicates with SFSC 2 702, which communicates with SFSS 2 706, which communicates with BMD 2 722. For all of the remaining server/client files, the component stack is similar. The nth occurrence of the component stack is shown by File n 504, SFSx n 704, SFSy n 707, and BMD n 724 where x=C and y=S.

The file stack shown for the local file is as follows: file 3 503 uses a local file system (SFSL 3) 703, which uses a block mode device (BMD 3) 723 residing on the local system. Multiple local file systems can be used up to n, shown by the component stack File n 504, SFSx n 704, SFSy n 707, and BMD n 724 where x=L and y=L.

Distributed Servers

Figure 8:
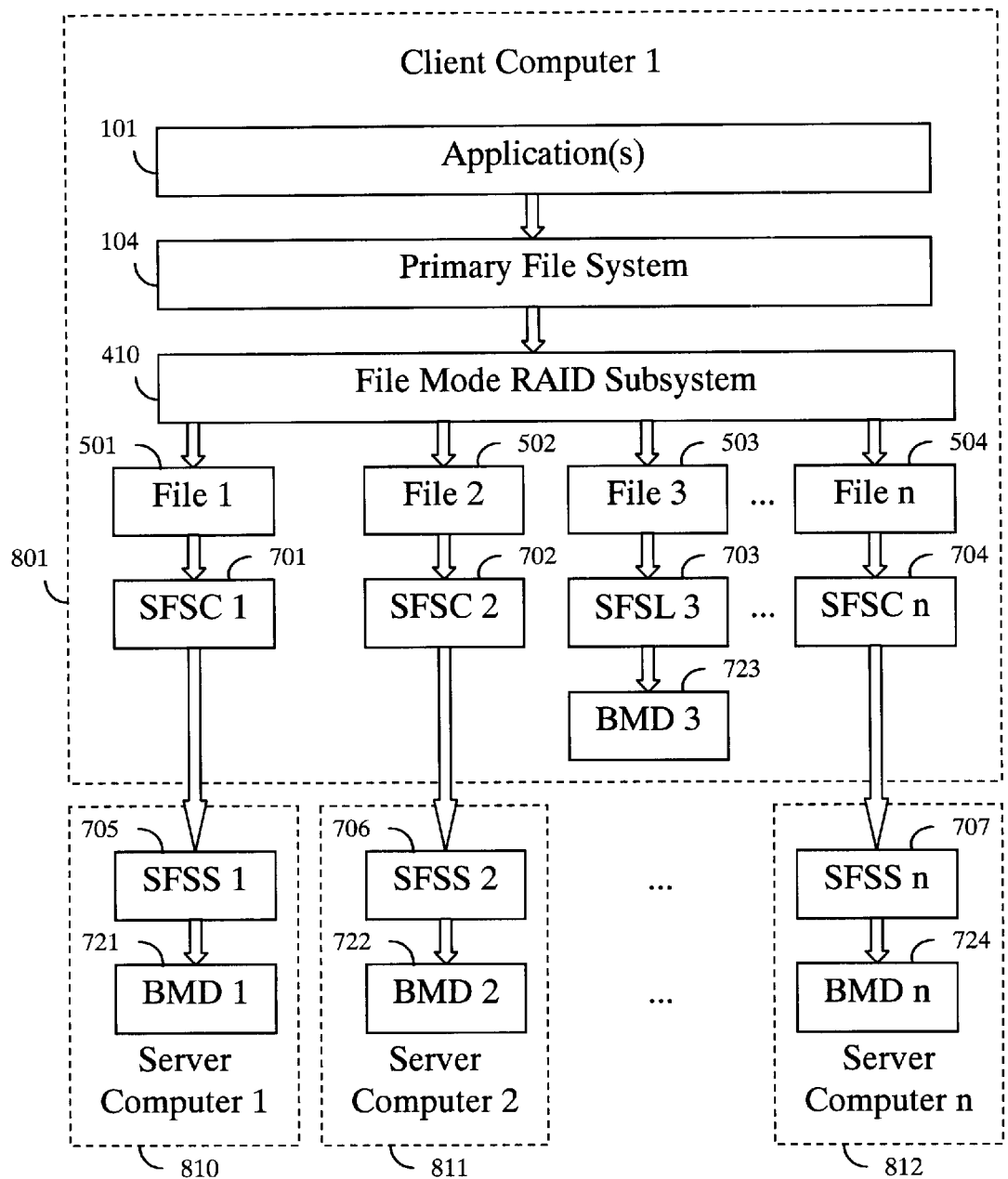
FIG. 8 is a block diagram of a file mode RAID subsystem in a client computer.

FIG. 8 shows how the components of FIG. 7 can be arranged on particular computer systems. A client computer 1 801 executes the application 101 and the primary (local) file system 104. The local file system 104 interacts 410 with the redundant files 501–504. The files use their respective client secondary file systems 701–702, 704, and one local file system 703. The block mode device (BMD 3) 723 is also co-located with the client computer 801.

Server computers 810–812 each include the server side secondary file systems (SFSS) 705–707, and the block mode devices (BMD) 721–722, 724. Specifically, server computer 1 810 has SFSS 1 705 and BMD 1 721. Server computer 2 811 has SFSS 2 706 and BMD 2 722. This arrangement can be extended to any number of servers up to n, where server computer n 812 uses SFSS n 707 and BMD n 724.

Figure 9:
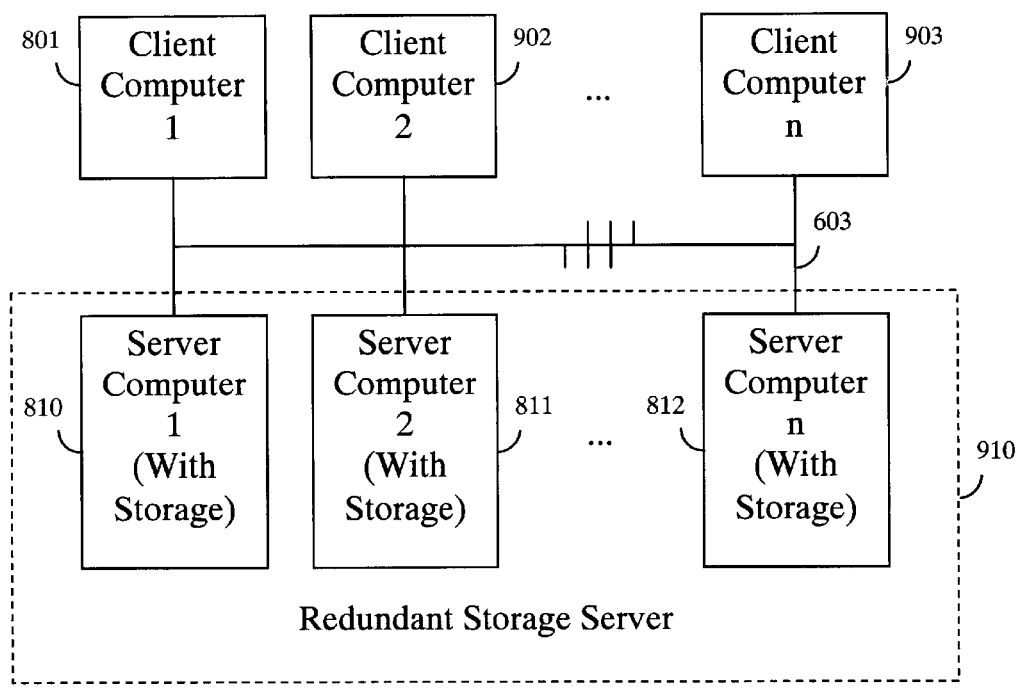
FIG. 9 is a block diagram of a redundant server system according to the invention.

FIG. 9 shows the arrangement of FIG. 8 using a standard networked environment. In this case, the client computer 1 801 includes the RAID Device 400 sharing files via the network 603. Client computer 2 902 through client computer n 903 also uses the file mode RAID Device 400 using files communicating through standard network 603.

Figure 1:
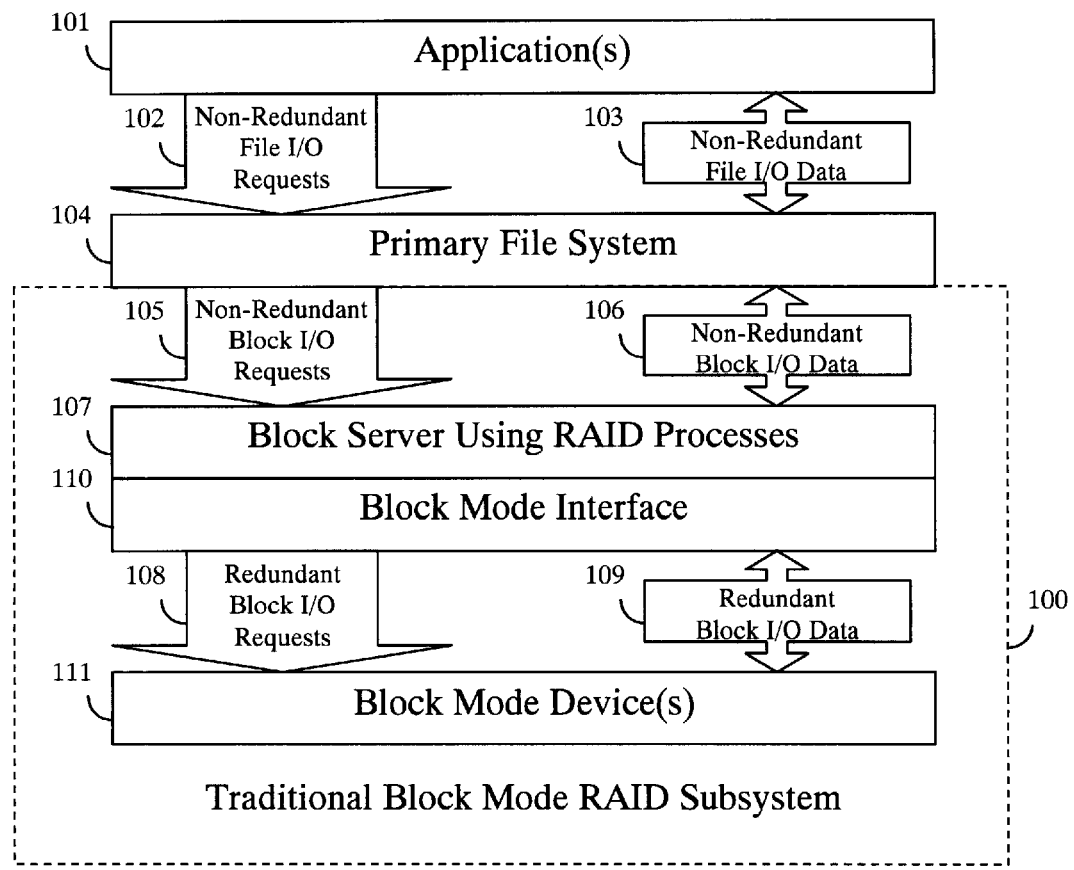
FIG. 1 is a block diagram of a prior art block mode RAID subsystem.
Figure 2:
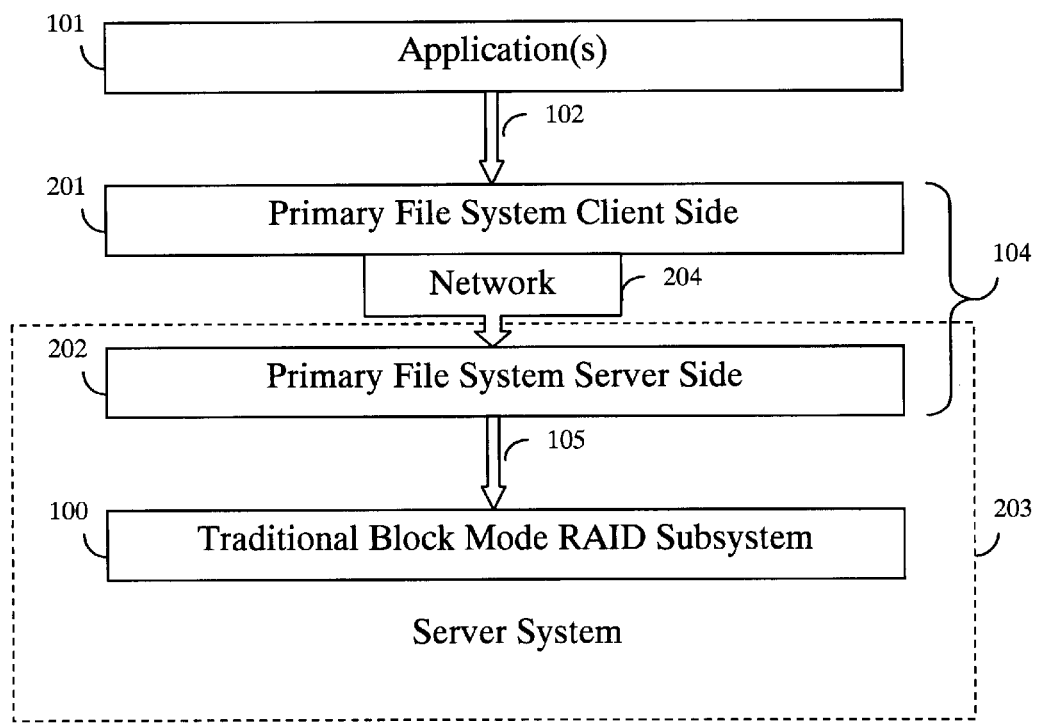
FIG. 2 is a block diagram of prior art client-server system.
Figure 3:
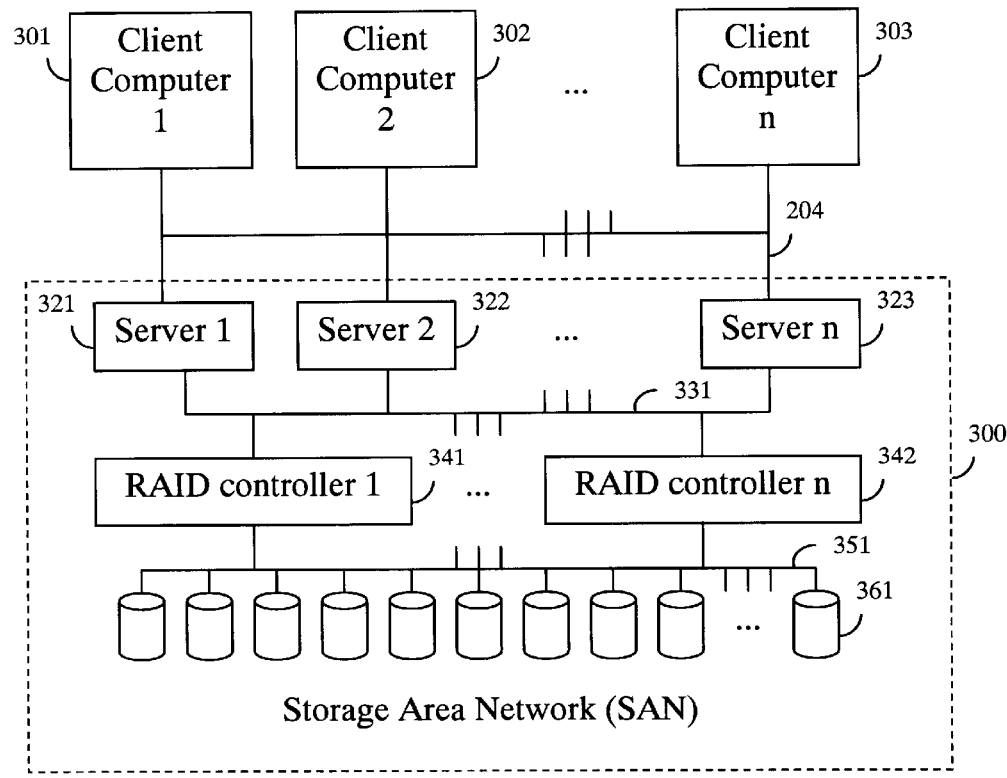
FIG. 3 is a block diagram of prior art storage area network (SAN)

The server computers 810–812 form a redundant storage server 910 that can replace the SAN 300 of FIG. 3. Each server has local storage, and each server can communicate with any of the client computers. The client computers 801–902–903 tolerate a failure of any component of the redundant storage server 910. Thus, this arrangement provides at least the same level of tolerance as the SAN 300, but with a far simpler structure, and commodity components. In fact, only the client computers need any specialized software, i.e., the RAID subsystem 400 according to the invention.

One big difference, between the redundant storage server 910 according to the invention and the prior art SAN 300 of FIG. 3, is that the client computers in FIG. 9 figure are different. In FIG. 9, the clients 801–902–903 execute the file mode RAID subsystem 400 with redundant files according to the invention, whereas the clients 301–303 of FIG. 3 only execute the client side component of the file system, needless to say, without inherent redundancy on the client side.

Complete Replacement of SAN

Figure 10:
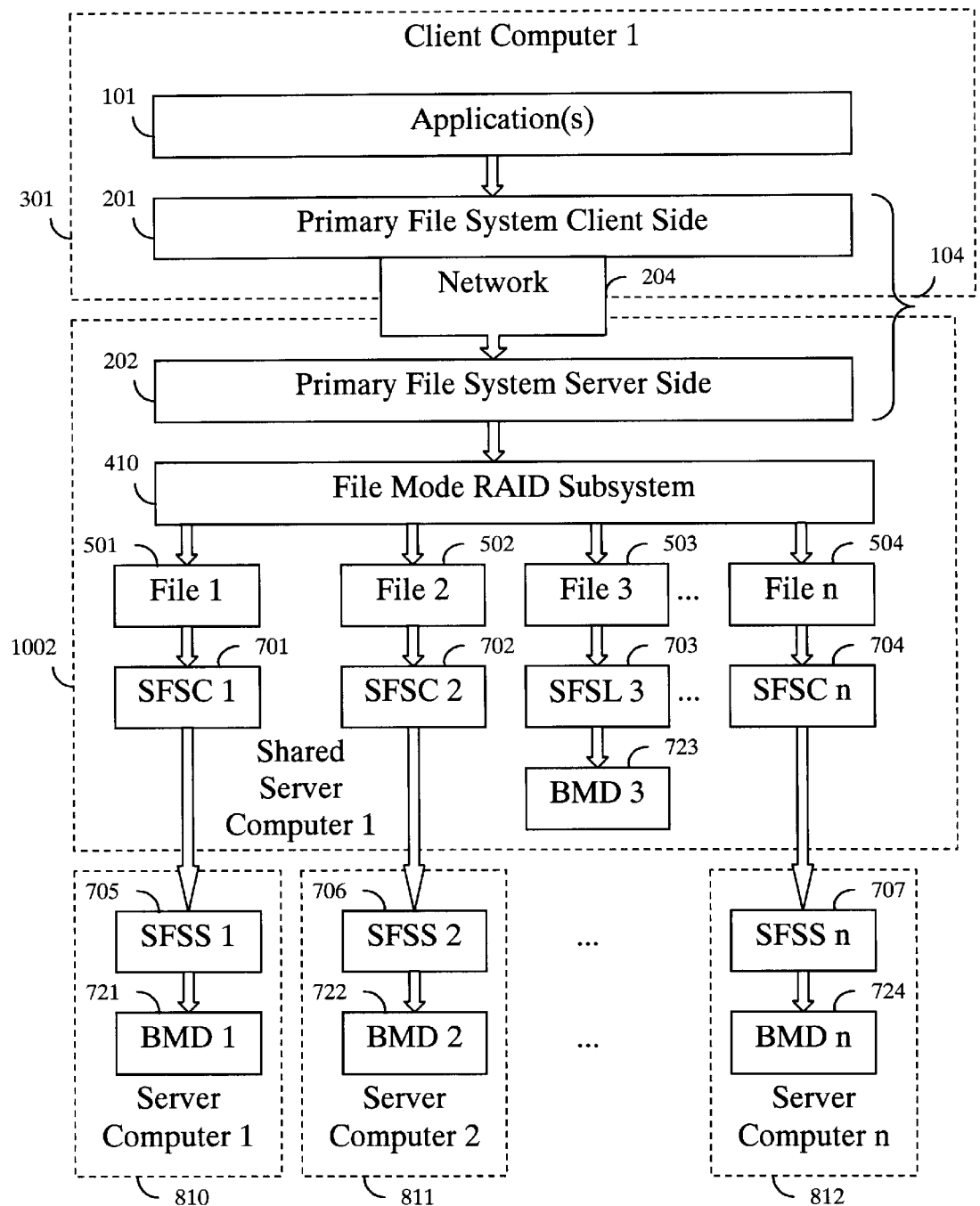
FIG. 10 is a block diagram of a shared server computer.

FIG. 10 shows the computer breakout the components in FIG. 7, but with an added shared server computer 1 1002. In this arrangement, the client computer 1 301 is exactly the same as the client computer 1 301 shown in FIG. 3. The network 204 is now the same network as in FIG. 3.

The shared server computer 1 1002 uses the redundant files as shown for the client computer in FIG. 8. The file system 104 is now shared between the client and the server using the network 204.

Figure 11:
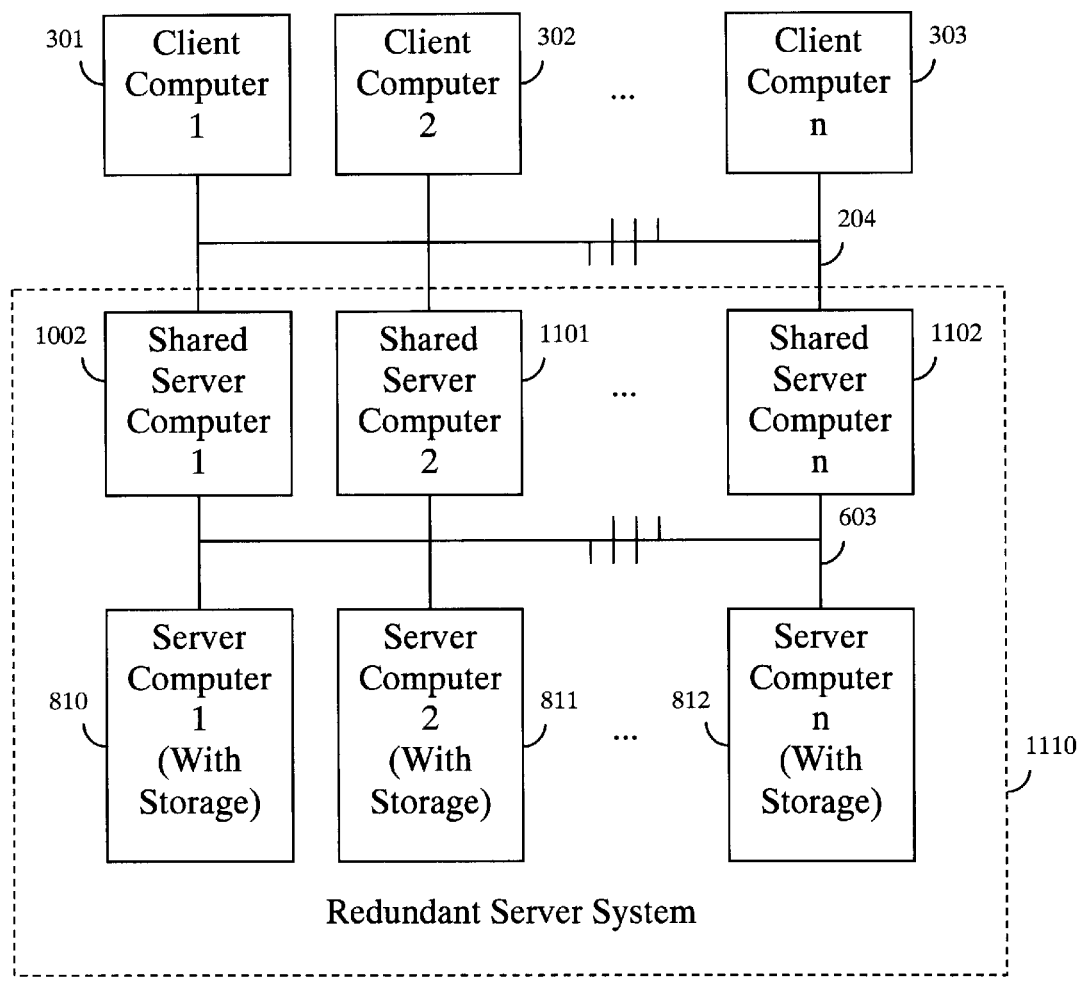
FIG. 11 is a block diagram of a shared and redundant and server system.

FIG. 11 shows a redundant server system 1110 with shared server computers 1002–1101–1102 connected via a network 603 to the server computers 810–812 with just file system storage. In this arrangement, the clients 301–303, connected to the server via the network 204, are as shown in FIG. 3. In this case, the clients need no special drivers, and only the shared servers 1002–1101–1102 need the RAID subsystem.

Using NVRAM for Performance

The client computer 801 in FIG. 8, and the shared server computer 1002, both use the file mode RAID subsystem 400 for redundancy. In order to improve performance, the RAID subsystem 400 can use non-volatile random access memory (NVRAM) on the client side. If the RAID subsystem includes a write-back cache implemented with NVRAM, delayed writes on the block mode device created by the invention are enabled.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for accessing stored data maintained by a redundant array of independent disk (RAID) subsystem, comprising:

generating, in an application program, a non-redundant file I/O request to a primary file system;

receiving, in a RAID subsystem, a non-redundant block I/O request from the primary file system;

translating, in the RAID subsystem, the non-redundant block I/O request into a redundant file I/O request for redundant file data maintained by the RAID subsystem; and translating, in a secondary file system, the redundant file I/O request into a plurality of non-redundant block I/O requests for a block mode device storing the redundant file data.

2. The method of claim 1 further comprising:

accessing non-redundant block I/O data in the block mode device in response to receiving the plurality of non-redundant block I/O request;

accessing redundant file I/O data in the secondary file system in response to the redundant file I/O request; and accessing non-redundant block I/O data in the primary file system in response to the non-redundant block I/O requests.

3. The method of claim 1 wherein the block mode device includes a plurality of disk drives, and further comprising:

storing a particular non-redundant block on at least at least two disk drives of the block mode device.

4. The method of claim 1 wherein the primary file system includes a primary client side and a primary server side and the secondary file system includes a secondary client side and a secondary server side, and further comprising:

communicating between the primary client side and the primary server side of the primary file system via a first network; and communicating between the secondary client side and the secondary server side of the secondary file system via a second network.

5. The method of claim 1 wherein the first network is a local area network, and the second network is a wide area network.

6. The method of claim 1 further comprising:

maintaining at least two redundant files via the secondary file system for each single file maintained by the primary file system.

7. The method of claim 1 wherein the RAID subsystem maintains the redundant files using the secondary file system, each redundant file comprising a collection of related blocks including metadata and user data distributed over multiple physical devices of the block mode device such that each redundant file can be recovered after a failure of any one of the multiple physical devices.

8. The method of claim 1 wherein the secondary file system includes a server secondary file system and a local secondary file system, and further comprising:

executing the server secondary file system on a server computer; and executing the local secondary file system on a client computer.

9. The method of claim 3 wherein the plurality of disk drives are connected to multiple different computers.

10. The method of claim 9 wherein the multiple different computers are connected by a wide area network.

11. The method of claim 1 further comprising at least one client computer and at least one server computer, and further comprising:

executing the RAID subsystem on the at least one client computer.

12. The method of claim 1 further comprising at least one client computer and at least one server computer, and further comprising:

executing the RAID subsystem on the at least one server computer.

13. A redundant array of independent disk (RAID) subsystem, comprising:

a front-end interface configured to process non-redundant I/O requests received from a primary file system communicating with an application program; and a back-end interface configured to process redundant I/O requests corresponding to the non-redundant I/O requests, the redundant I/O requests to be issued to a secondary file system communicating with a block mode device.

14. The RAID subsystem of claim 13 wherein the non-redundant I/O request are block mode requests, and the redundant requests I/O are file mode requests.

15. The RAID system of claim 13 wherein the block mode device includes a plurality of disk drives, at least two disk drives storing a different copy of identical non-redundant block I/O data for a particular non-redundant block I/O request.

16. The RAID subsystem 15 wherein the plurality of disk drives are connected multiple different computers and the multiple different computers are connected via a wide area network.

17. The RAID system of claim 13 further comprising:

a first network connecting a client side with a server side of the primary file system; and a second network connecting a client side with a server side of the secondary file system.

18. The RAID subsystem of claim 13 further comprising:

at least one client computer and at least one server computer, and further comprising:

executing the RAID subsystem on the at least one client computer.

19. The RAID subsystem of claim 13 further comprising:

at least one client computer and at least one server computer, and further comprising:

executing the RAID subsystem on the at least one server computer.

20. A redundant array of independent disk (RAID) subsystem, comprising:

a front-end interface configured to process non-redundant block I/O requests received from an application program using non-redundant block mode access; and a back-end interface configured to process redundant file I/O requests corresponding to the non-redundant requests, the redundant requests to be issues to a secondary file system using redundant file mode access, the secondary file system communicating with a block mode device storing redundant files.

* * * * *